United States Patent
Umegatani

(10) Patent No.: US 11,145,063 B2
(45) Date of Patent: Oct. 12, 2021

(54) IMAGE PROCESSING APPARATUS

(71) Applicant: SUBARU CORPORATION, Tokyo (JP)

(72) Inventor: Taku Umegatani, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 147 days.

(21) Appl. No.: 16/038,930

(22) Filed: Jul. 18, 2018

(65) Prior Publication Data
US 2019/0087963 A1    Mar. 21, 2019

(30) Foreign Application Priority Data

Sep. 19, 2017    (JP) .................................. 2017-179117

(51) Int. Cl.
| | |
|---|---|
| *G06K 9/00* | (2006.01) |
| *G06T 7/13* | (2017.01) |
| *G06T 7/73* | (2017.01) |
| *G06T 7/593* | (2017.01) |
| *G06K 9/46* | (2006.01) |

(52) U.S. Cl.
CPC ............ *G06T 7/13* (2017.01); *G06K 9/00798* (2013.01); *G06K 9/00805* (2013.01); *G06K 9/4604* (2013.01); *G06T 7/593* (2017.01); *G06T 7/73* (2017.01); *G06T 2207/30256* (2013.01); *G06T 2207/30261* (2013.01)

(58) Field of Classification Search
CPC ........... G06K 9/00798; G06K 9/00805; G06K 9/4604; G06T 2207/30256; G06T 2207/30261; G06T 7/13; G06T 7/593; G06T 7/73; B41F 27/00; B41F 27/12; B41N 1/12
See application file for complete search history.

(56) References Cited

U.S. PATENT DOCUMENTS

| | | | |
|---|---|---|---|
| 2010/0201509 A1* | 8/2010 | Hara | ..................... G08G 1/166 340/435 |
| 2015/0165972 A1 | 6/2015 | Takemae et al. | |
| 2015/0269446 A1* | 9/2015 | Takemae | .................. G06T 7/73 382/199 |

(Continued)

FOREIGN PATENT DOCUMENTS

JP        5829980 B2    12/2015

*Primary Examiner* — Tom Y Lu
(74) *Attorney, Agent, or Firm* — McDermott Will & Emery LLP

(57) ABSTRACT

An image processing apparatus includes an edge detector and a sidewall information calculator. The edge detector detects outlines extending from lower left toward upper right with respect to objects located on left side of a vehicle, and detects outlines extending from lower right toward upper left with respect to objects located on right side of the vehicle, on the basis of a luminance value of an image out of a pair of images captured by a stereo camera. The sidewall information calculator recognizes, on the basis of three-dimensional positional information of the objects having the outlines detected by the edge detector, whichever of the objects having the outlines detected by the edge detector is located at a predetermined height or greater from a road surface and has a predetermined length or greater in a front-rear direction of the vehicle, as a sidewall.

19 Claims, 6 Drawing Sheets

(56) References Cited

U.S. PATENT DOCUMENTS

| | | | | |
|---|---|---|---|---|
| 2015/0332114 A1* | 11/2015 | Springer | ............... | B60W 50/14 |
| | | | | 348/148 |
| 2017/0098132 A1* | 4/2017 | Yokota | ............... | G06K 9/00805 |
| 2019/0026569 A1* | 1/2019 | Yamada | ............... | G06K 9/4638 |
| 2019/0156129 A1* | 5/2019 | Kakegawa | ......... | G06K 9/00805 |

* cited by examiner

IMAGE PROCESSING APPARATUS

CROSS-REFERENCE TO RELATED APPLICATIONS

The present application claims priority from Japanese Patent Application No. 2017-179117 filed on Sep. 19, 2017, the entire contents of which are hereby incorporated by reference.

BACKGROUND

The technology relates to an image processing apparatus that recognizes three-dimensional positional information of an object, on the basis of an image in a traveling direction of a vehicle captured by a stereo camera.

Some vehicles include an image processing apparatus as a vehicle driver-assistance system that recognizes vehicle exterior environment. The image processing apparatus recognizes positional relation of an object to the vehicle, on the basis of a pair of images in a traveling direction of the vehicle captured by a stereo camera. The stereo camera includes a pair of cameras.

For example, Japanese Patent No. 5829980 describes a technique of recognizing a road-side object such as a curbstone from images in a traveling direction of a vehicle captured by a stereo camera. The recognition of the road-side object is made with the use of a pattern matching process using a template image.

SUMMARY

An aspect of the technology provides an image processing apparatus including an edge detector and a sidewall information calculator. The edge detector is configured to detect outlines extending from lower left toward upper right with respect to objects located on left side of a vehicle, and detects outlines extending from lower right toward upper left with respect to objects located on right side of the vehicle, on the basis of a luminance value of an image out of a pair of images. The pair of images are images in a traveling direction of a vehicle captured by a stereo camera. The sidewall information calculator is configured to recognize, on the basis of three-dimensional positional information of the objects having the outlines detected by the edge detector, whichever of the objects having the outlines detected by the edge detector is located at a predetermined height or greater from a road surface and has a predetermined length or greater in a front-rear direction of the vehicle, as a sidewall.

An aspect of the technology provides an image processing apparatus including circuitry. The circuitry is configured to detect outlines extending from lower left toward upper right with respect to objects located on left side of a vehicle, and detects outlines extending from lower right toward upper left with respect to objects located on right side of the vehicle, on the basis of a luminance value of an image out of a pair of images. The pair of images are images in a traveling direction of a vehicle captured by a stereo camera. The circuitry is configured to recognize, on the basis of three-dimensional positional information of the objects having the outlines detected, whichever of the objects having the outlines detected is located at a predetermined height or greater from a road surface and has a predetermined length or greater in a front-rear direction of the vehicle, as a sidewall.

DETAILED DESCRIPTION

Figure 1:
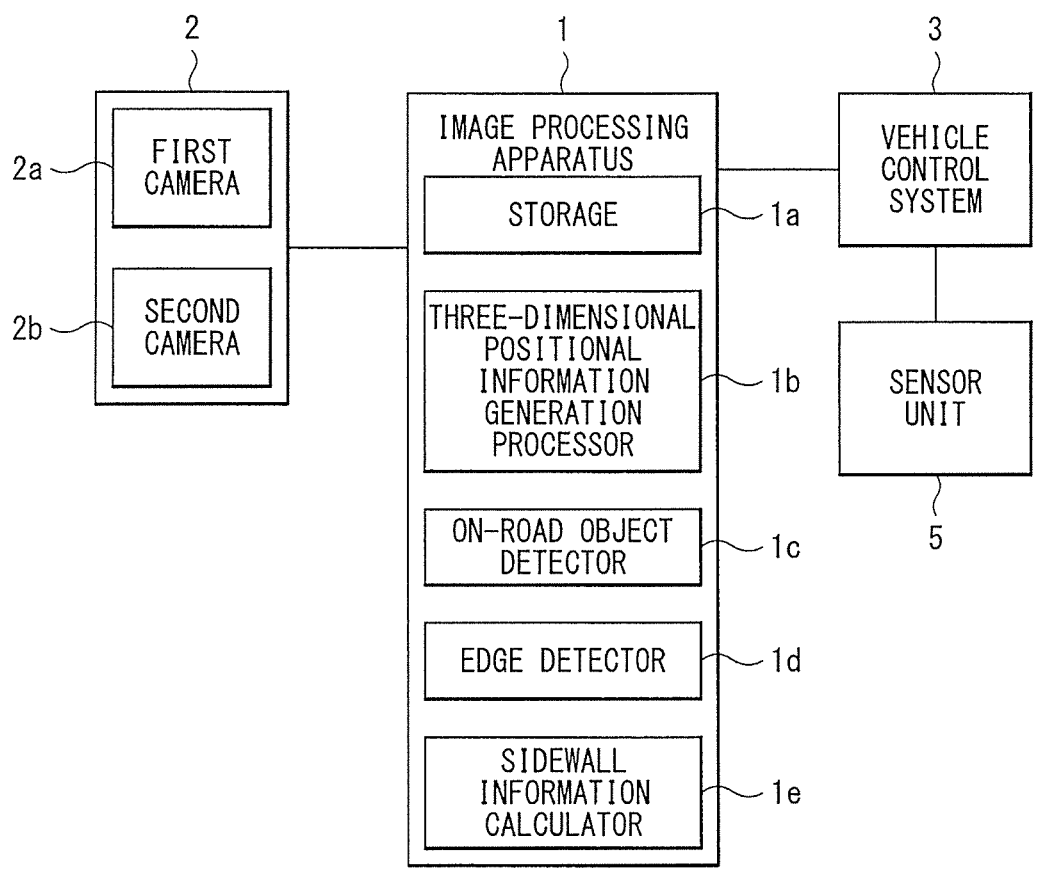
FIG. 1 is a block diagram illustrating a configuration of an image processing apparatus.

In the following, some preferred but non-limiting implementations of the technology are described in detail with reference to the accompanying drawings. Note that the drawings to be used in the following description are drawn to different scales for different components, in order to represent the components in sizes large enough to recognize them on the drawings. The technology is by no means limited to the number of the components, shapes of the components, rates of the sizes of the components, nor relative positional relation of the components as illustrated in the drawings. Further, elements in the following example implementations which are not recited in a most-generic independent claim of the disclosure are optional and may be provided on an as-needed basis.

Recognizing not only curbstones but also sidewalls such as guardrails by a pattern matching process causes an increase in a load of a recognition process. One reason may be as follows. Sidewalls such as guardrails come in various shapes. Even if they have the same shapes, their features on images change with differences in their colors or differences in how they are illuminated with light. As a result, the recognition process necessitates a pattern matching process using a number of template images. The increase in the load of the recognition process contributes to a decrease in the number of times the recognition is performed per predetermined time. Such an increase in the load of the recognition process is undesirable for driver-assistance systems, because they are expected to give instantaneous responses.

It is desirable to provide an image processing apparatus that makes it possible to execute, with a light load, sidewall recognition based on images captured in a traveling direction of a vehicle.

FIG. 1 illustrates an image processing apparatus 1 according to an implementation of the technology. Referring to FIG. 1, the image processing apparatus 1 may be mounted on a vehicle on which a stereo camera 2 is fitted. The image processing apparatus 1 may calculate a relative position of an object in images captured by the stereo camera 2, to the vehicle. The image processing apparatus 1 may output the relative position calculated.

Moreover, the image processing apparatus 1 may recognize a sidewall from the images captured by the stereo camera 2. The sidewall may be disposed sideward of a road on which the vehicle is traveling, and be disposed along the road. The image processing apparatus 1 may output a result of the recognition, as sidewall information.

As used herein, the concept of the "sidewall" is not limited to a simple wall but may include, for example, a guard fence such as a guardrail, a sound insulation wall, a handrail, a curbstone, and a mound. The sidewall may be defined as, for example, an obstacle that hinders a vehicle from traveling, is located sideward of a road at a predetermined height or greater from a road surface, and is disposed substantially in parallel to the road with a predetermined length or greater.

The stereo camera 2 may include a first camera 2a and a second camera 2b as a pair of image-capturing units having different viewpoints. The first camera 2a and the second camera 2b may be spaced at a predetermined distance in a vehicle-widthwise direction, so that their visual fields cover the traveling direction of the vehicle. The first camera 2a and the second camera 2b may capture moving images at the same frame rates in synchronization.

The first camera 2a and the second camera 2b may be installed at the same height, with their optical axes being parallel to each other. In this implementation, for example, an image captured by the first camera 2a is called a reference image, while an image captured by the second camera 2b is called a comparative image.

The stereo camera 2 may include, for example, an analog/digital (A/D) converter, and an image corrector. The A/D converter may convert captured images to digital data. The image corrector may perform image correction such as noise removal and luminance value correction, on the images. The stereo camera 2 may transmit the captured images, as the digital data, to the image processing apparatus 1.

The image processing apparatus 1 may include a computer. The computer may include, for example, a central processing unit (CPU), a read only memory (ROM), a random access memory (RAM), and input and output interfaces. The CPU, the ROM, the RAM, and the input and output interfaces may be coupled to a bus. It is to be noted that the image processing apparatus 1 may be incorporated in a vehicle control system 3. The vehicle control system 3 may include a computer that controls operation of the vehicle. Alternatively, the image processing apparatus 1 may be a computer separate from the vehicle control system 3.

The image processing apparatus 1 may be able to perform communication with the vehicle control system 3. The vehicle control system 3 may recognize situations including surrounding environment around the vehicle, and execute driver-assistance-related operation, on the basis of information inputted from a sensor unit 5, and on the basis of information inputted from the image processing apparatus 1. The sensor unit 5 may include, for example, a vehicle speed sensor, a steering angle sensor, an acceleration sensor, and an angular velocity sensor that are installed in the vehicle.

The driver-assistance-related operation may include, for example, alarm operation and semi-automatic or automatic driver-assistance operation. The alarm operation may include outputting a lane-deviation alarm and a collision alarm to a driver. The driver-assistance operation may include, for example, automatic braking and automatic steering. Driver-assistance using the stereo camera is a known technique, and detailed description thereof is omitted.

The image processing apparatus 1 may include a storage 1a, a three-dimensional positional information generation processor 1b, an on-road object detector 1c, an edge detector 1d, and a sidewall information calculator 1e. It is to be noted that the three-dimensional positional information generation processor 1b, the on-road object detector 1c, the edge detector 1d, and the sidewall information calculator 1e may be installed as separate hardware units that execute respective functions. Alternatively, the three-dimensional positional information generation processor 1b, the on-road object detector 1c, the edge detector 1d, and the sidewall information calculator 1e may be installed as software that causes the CPU to execute predetermined programs to achieve the respective functions.

The storage 1a may store data of the pair of images, i.e., the reference image and the comparative image, that are inputted from the stereo camera 2. The storage 1a may further store a width of the vehicle, i.e., a vehicle width dimension. In this implementation, for example, the vehicle with dimension may be stored in the vehicle control system 3. The image processing apparatus 1 may acquire the vehicle width dimension by the communication with the vehicle control system 3, and store the vehicle width dimension thus acquired, in the storage 1a.

The three-dimensional positional information generation processor 1b may calculate three-dimensional positional information of the object with respect to the stereo camera 2, on the basis of the reference image and the comparative image stored in the storage 1a. The object may be captured at any coordinates on the reference image. The calculation may be made with the use of a so-called stereo matching method. How to calculate a three-dimensional position of the object from the pair of images captured by the stereo camera 2 is a known technique, and detailed description thereof is omitted.

Figure 2:
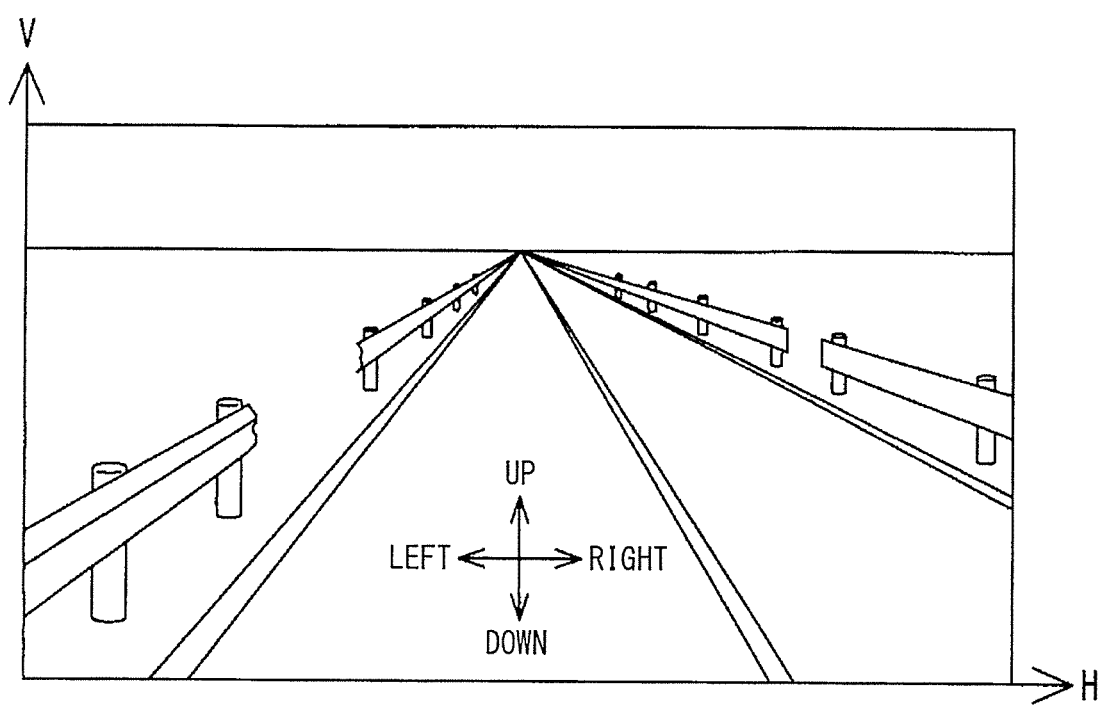
FIG. 2 describes an example of a reference image.

FIG. 2 illustrates one example of the reference image captured by the first camera 2a out of the pair of cameras included in the stereo camera 2. In the following description, in the reference image, an axis parallel to the vehicle-widthwise direction of the vehicle is called a horizontal axis H, while an axis parallel to an up-down direction of the vehicle is called a vertical axis V. In relation to directions along the horizontal axis H, a rightward direction as viewed in a frontward direction of the vehicle is called "right". An opposite direction to the "right" is called "left". In relation to directions along the vertical axis V, an upward direction of the vehicle is called "up". A downward direction of the vehicle is called "down".

The naming of the axes and the directions is for purpose of description, and is not intended to define a posture of the stereo camera 2. Generally, definitions of pixel arrangement and output signals of cameras are given with terms "horizontal" and "vertical", but these terms do not necessarily coincide with the horizontal axis H and the vertical axis V in this implementation.

The three-dimensional positional information generation processor 1b may calculate, regarding any coordinate values along the horizontal axis H and the vertical axis V, three-dimensional coordinate values of the object captured at the relevant coordinate values, with respect to the stereo camera 2 in real space. The three-dimensional positional information generation processor 1b may output the three-dimensional coordinate values thus calculated, as the three-dimensional positional information. The three-dimensional positional information may be represented, for example, with the use of coordinate values with a road surface directly below a midpoint of the stereo camera 2 serving as an origin, with the vehicle-widthwise direction being an X axis, with the up-down direction being a Y axis, and with a front-rear direction being a Z axis.

Generation of the three-dimensional positional information by the three-dimensional positional information generation processor 1b may be performed with respect to every frame of the images captured by the stereo camera 2.

The on-road object detector 1c may detect an on-road object on the basis of the three-dimensional positional information calculated by the three-dimensional positional information generation processor 1b. The on-road object is an object that is present on the road surface on which the vehicle is traveling. In one specific but non-limiting example, the on-road object detector 1c may, first, detect the road surface on which the vehicle is traveling, on the basis of the three-dimensional positional information. Thereafter, the on-road object detector 1c may perform grouping of a data group, out of the three-dimensional positional information. The data group may be located at a greater height than the road surface and gather themselves while satisfying predetermined conditions. The on-road object detector 1c may detect the data group thus grouped, as the on-road object. Non-limiting examples of the on-road object may include a vehicle, a pedestrian, a road sign, and a sidewall.

The detection of the on-road object by the on-road object detector 1c may be performed with respect to every frame of the images captured by the stereo camera 2.

The edge detector 1d may perform, on the reference image, an edge detection process in eight directions using luminance values. The eight directions are the right and left directions parallel to the horizontal axis H of the reference image, the up and down directions parallel to the vertical axis V, lower-right and upper-left directions parallel to an axis inclined clockwise by 45 degrees from the horizontal axis H, and upper-right and lower-left directions parallel to an axis inclined clockwise by 135 degrees from the horizontal axis H.

For example, in performing the edge detection process in the lower-right direction, the edge detector 1d may detect, as an edge, dots at which differential values of the luminance values become equal to or higher than a predetermined threshold, as is directed toward lower right along a line parallel to the axis inclined clockwise by 45 degrees from the horizontal axis H of the reference image.

The edge detector 1d may output, as a result of the edge detection process, information on coordinate values of the dots of the edge, in association with the direction in which the edge detection process is performed. The dots of the edge are dots indicating a position of the edge.

The edge detector 1d may be able to perform the edge detection process solely in one or more specified directions out of the eight directions. In the edge detection process by the edge detector 1d, reducing the number of the directions in which the edge detection process is performed makes it possible to decrease the time it takes to perform the process. Moreover, shrinking a range of the image within which the edge detection process by the edge detector 1d is performed makes it possible to decrease the time it takes to perform the process.

The edge detection process on the image in each of the eight directions is a general technique, and detailed description thereof is omitted.

The sidewall information calculator 1e may recognize the sidewall in the reference image, on the basis of the three-dimensional positional information by the three-dimensional positional information generation processor 1b, and on the basis of the result of the edge detection process by the edge detector 1d. The sidewall information calculator 1e may output a result of the recognition, as the sidewall information.

Figure 3A:
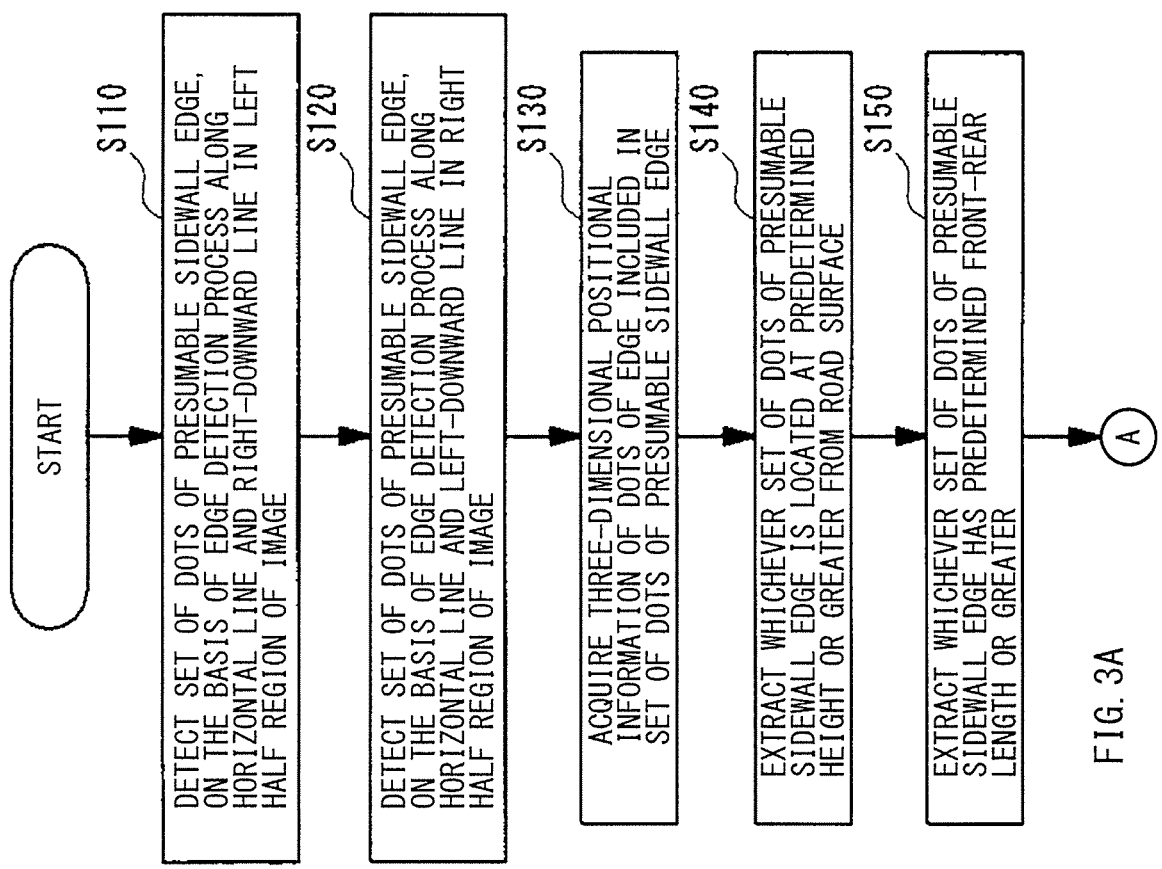
FIGS. 3A and 3B are flowcharts illustrating a sidewall information calculation process.
Figure 3B:
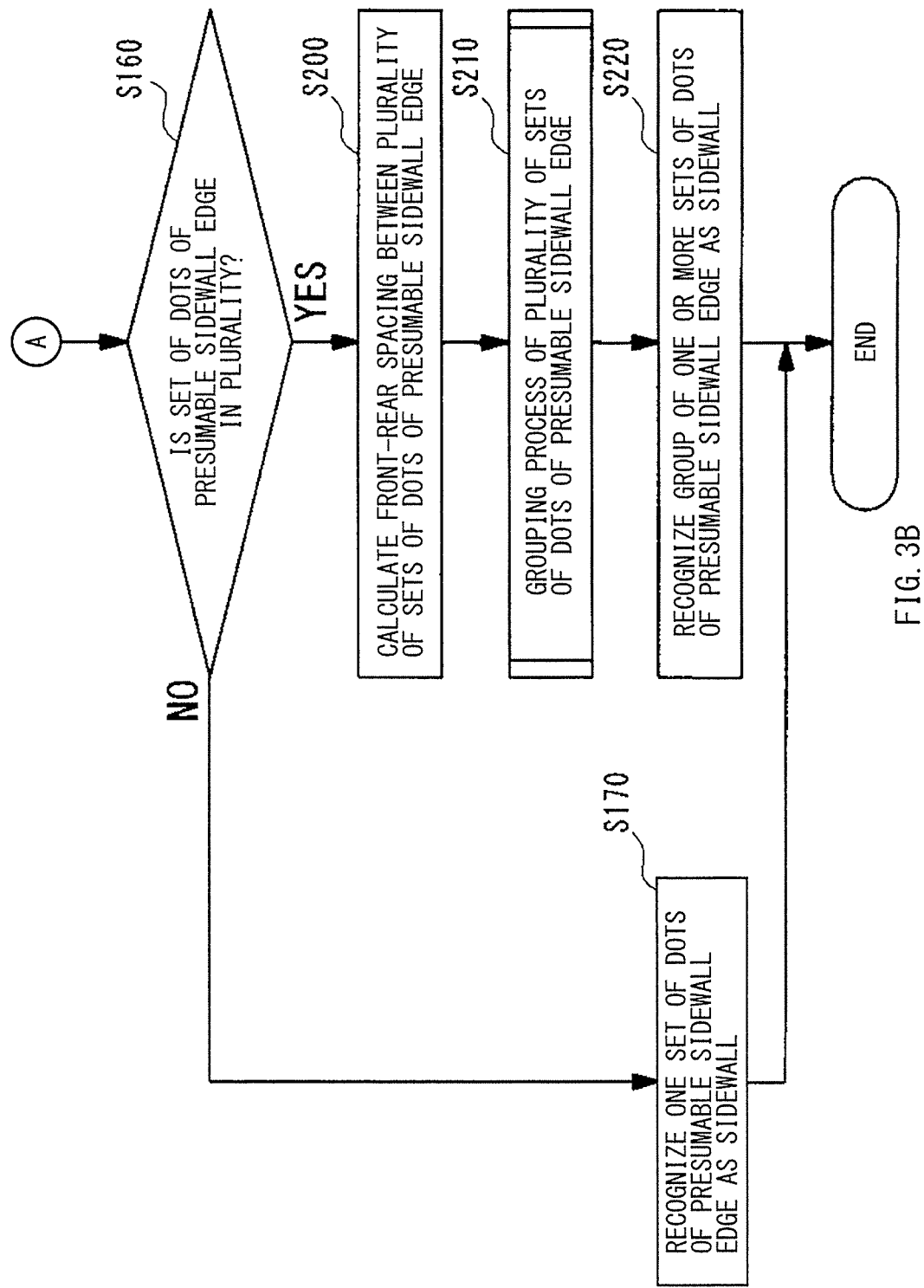

FIGS. 3A and 3B are flowcharts illustrating a sidewall information calculation process by the sidewall information calculator 1e. The sidewall information calculation process as illustrated in FIGS. 3A and 3B may be performed with respect to every frame of the images captured by the stereo camera 2.

The sidewall information calculation process may be executed, for example, as follows. First, in step S110, the sidewall information calculator 1e may allow the edge detector 1d to execute the edge detection process in two directions, i.e., in the down direction and the lower-right direction, on a left half region of the reference image, or the edge detection process in two directions, i.e., in the up direction and the upper-left direction, on the left half region of the reference image, or both. Thus, the sidewall information calculator 1e may extract, as a set of dots of a presumable sidewall edge, a set of the dots of the edge of the object having an outline extending from lower left toward upper right, in the left half region of the reference image.

Step S110 includes executing the edge detection process in the two directions or in the four directions on the half region of the reference image. Hence, it takes less time to complete step S110 than in a case with the execution of the edge detection process in the eight directions on an entirety of the reference image.

Thereafter, in step S120, the sidewall information calculator 1e may allow the edge detector 1d to execute the edge detection process in two directions, i.e., in the down direction and the lower-right direction, on a right half region of the reference image, or the edge detection process in two directions, i.e., in the up direction and the upper-left direction, on the right half region of the reference image, or both. Thus, the sidewall information calculator 1e may extract, as a set of dots of a presumable sidewall edge, a set of the dots of the edge of the object having an outline extending from lower right toward upper left, in the right half region of the reference image.

Step S120 includes executing the edge detection process in the two directions or in the four directions on the half region of the reference image. Hence, it takes less time to complete step S120 than in the case with the execution of the edge detection process in the eight directions on the entirety of the reference image.

It is to be noted that step S110 and step S120 may be executed in reverse order, or alternatively, step S110 and step S120 may be executed simultaneously.

The left half region of the reference image includes objects present on left side of the vehicle. On the left side of the vehicle, whichever object has the outline extending from lower left toward upper right is highly possibly a sidewall such as a guardrail disposed along the road, a line-shaped road marking that indicates a lane line, or a surrounding vehicle that is stopped or is traveling sideward of the vehicle.

The right half region of the reference image includes objects present on right side of the vehicle. On the right side of the vehicle, whichever object has the outline extending from lower right to upper left is highly possibly a sidewall such as a guardrail disposed along the road, a line-shaped road marking that indicates a lane line, or a surrounding vehicle that is stopped or is traveling sideward of the vehicle.

Accordingly, whichever object has an edge that constitutes the set of the dots of the presumable sidewall edge extracted in each of steps S110 and S120 is highly possibly a sidewall, a road marking, or a surrounding vehicle.

Thereafter, in step S130, the sidewall information calculator 1e may acquire the three-dimensional positional information of the dots of the edge included in the set of the dots of the presumable sidewall edge.

Thereafter, in step S140, the sidewall information calculator 1e may extract whichever set of the dots of the presumable sidewall edge is located at a predetermined height or greater from the road surface. In this implementation, for example, the sidewall information calculator 1e may extract whichever set of the dots of the presumable sidewall edge is located at a height of 30 centimeters or greater from the road surface. In other words, in step S140, excluded is the set of the dots of the presumable sidewall edge that corresponds to a road marking and a curbstone having a small height, out of the objects.

Thereafter, in step S150, the sidewall information calculator 1e may extract whichever set of the dots of the presumable sidewall edge extracted in step S140 has a predetermined length or greater in the front-rear direction. Here, the length of the set of the dots of the presumable sidewall edge means a distance from a dot of the edge that is included in any set of the dots of the presumable sidewall edge and is nearest to the vehicle, to a dot of the edge that is included in the relevant set of the dots of the presumable sidewall edge and is farthest from the vehicle. In this implementation, for example, the sidewall information calculator 1e may extract whichever set of the dots of the presumable sidewall edge has a length of 20 meters or greater. By executing step S150, excluded is the set of the dots of the presumable sidewall edge that corresponds to an outline of a surrounding vehicle that is traveling or is stopped on the road surface.

By executing steps S140 and S150, extracted is whichever set of the dots of the presumable sidewall edge is located at the predetermined height or greater from the road surface and has the predetermined length or greater, on each of the right and left sides of the vehicle.

Thereafter, in step S160, the sidewall information calculator 1e may determine whether or not the set of the dots of the presumable sidewall edge extracted in step S150 is in a plurality.

In step S160, in a case where a determination has been made that the set of the dots of the presumable sidewall edge is not in the plurality, the sidewall information calculator 1e may move on to step S170. In other words, in a case where the set of the dots of the presumable sidewall edge extracted in step S150 is in a singularity, the sidewall information calculator 1e may move on to step S170.

In step S170, the sidewall information calculator 1e may recognize an on-road object detected by the on-road object detector 1c, as a single sidewall, on the basis of the singularity of the set of the dots of the presumable sidewall edge.

Meanwhile, in step S160, in a case where a determination has been made that the set of the dots of the presumable sidewall edge is in the plurality, the sidewall information calculator 1e may move on to step S200.

In step S200, the sidewall information calculator 1e may calculate a spacing in the front-rear direction, between whichever of the plurality of the sets of the dots of the presumable sidewall edge do not overlap in the front-rear direction. The spacing in the front-rear direction between a pair of the sets of the dots of the presumable sidewall edge means a distance from a far dot to a near dot. The far dot is a dot of the edge that is farthest from the vehicle and is included in a nearer one to the vehicle out of the pair of the sets of the dots of the presumable sidewall edge. The near dot is a dot of the edge that is nearest to the vehicle and is included a farther one from the vehicle out of the pair of the sets of the dots of the presumable sidewall edge.

Thereafter, in step S210, the sidewall information calculator 1e may execute a grouping process. The grouping process includes allowing an aggregation of whichever are estimated to relate to a continuous sidewall, out of the plurality of the sets of the dots of the presumable sidewall edge extracted in step S150, to be an identical group.

Figure 4:
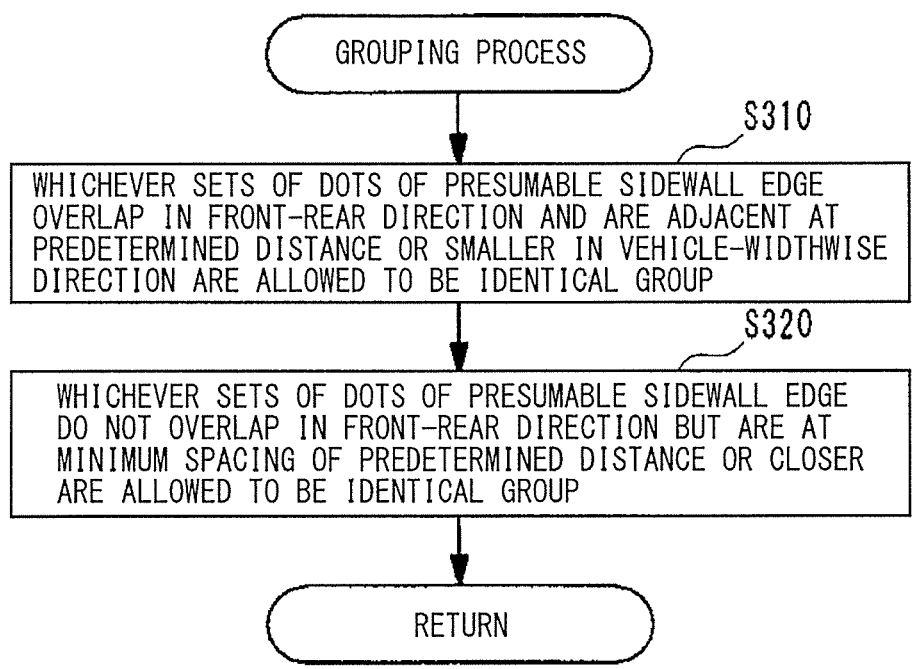
FIG. 4 is a flowchart illustrating a grouping process of a plurality of sets of dots of a presumable sidewall edge.

FIG. 4 is a flowchart of the grouping process to be executed in step S210, of the plurality of the sets of the dots of the presumable sidewall edge.

The grouping process of the plurality of the sets of the dots of the presumable sidewall edge may be executed, for example, as follows. First, in step S310, the sidewall information calculator 1e may allow whichever overlap in the front-rear direction and are adjacent at a predetermined distance or smaller in the vehicle-widthwise direction, out of the plurality of sets of the dots of the presumable sidewall edge, to be the identical group. For example, the sidewall information calculator 1e may allow whichever overlap in the front-rear direction and are at a spacing in the vehicle-widthwise direction of 0.5 meter or closer, out of the plurality of the sets of the dots of the presumable sidewall edge, to be the identical group.

Figure 5:
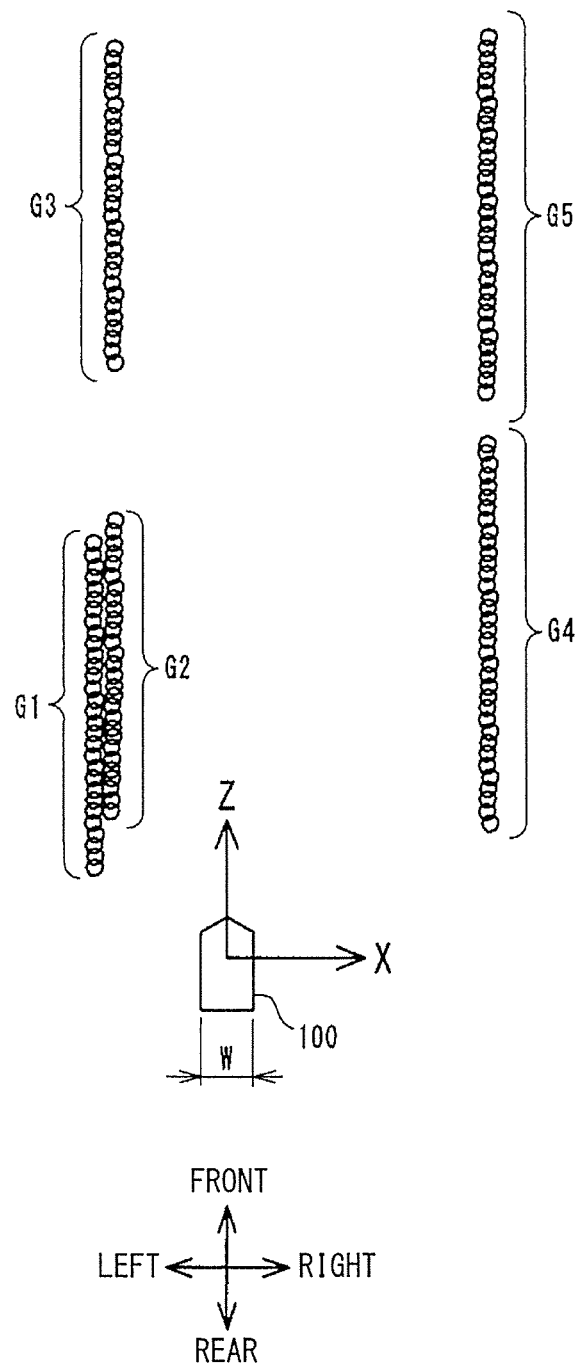
FIG. 5 schematically describes an example of the grouping process of the plurality of sets of the dots of the presumable sidewall edge.

FIG. 5 illustrates an example of X-Z coordinates of the plurality of the sets of the dots of the presumable sidewall edge, as viewed from above in a parallel direction to the Y axis. In FIG. 5, an up-down direction in the figure is a front-rear direction of a vehicle 100, and an upward direction in the figure is a traveling direction of the vehicle 100. FIG. 5 illustrates an example with five sets G1 to G5 of the dots of the presumable sidewall edge.

In step S310, whichever overlap in the front-rear direction and are adjacent in the vehicle-widthwise direction, out of the sets of the dots of the presumable sidewall edge illustrated in FIG. 5, may be allowed to be the identical group. For example, the sets G1 and G2 of the dots of the presumable sidewall edge may be allowed to be the identical group. It is to be noted that in the example illustrated in FIG. 5, the set G4 of the dots of the presumable sidewall edge overlaps in the front-rear direction with the sets G1 and G2 of the dots of the presumable sidewall edge. However, the set G4 of the dots of the presumable sidewall edge is considerably spaced away in the vehicle-widthwise direction from the sets G1 and G2 of the dots of the presumable sidewall edge. Therefore, the set G4 of the dots of the presumable sidewall edge may be allowed to be a different group from the sets G1 and G2 of the dots of the presumable sidewall edge.

Thereafter, in step S320, the sidewall information calculator 1e may allow whichever do not overlap in the front-rear direction but are at a minimum spacing of a first distance or closer, out of the plurality of the sets of the dots of the presumable sidewall edge, to be the identical group. The first distance may be, in this implementation, for example, a vehicle width dimension of the vehicle 100. The vehicle width dimension of the vehicle 100 may be stored in the storage 1a, as mentioned above.

In step S320, whichever do not overlap in the front-rear direction but are at the minimum spacing of the vehicle width W of the vehicle 100 or closer, out of the plurality of the sets of the dots of the presumable sidewall edge illustrated in FIG. 5, may be allowed to be the identical group. For example, the sets G4 and G5 of the dots of the presumable sidewall edge may be allowed to be the identical group. It is to be noted that in the example illustrated in FIG. 5, the set G3 of the dots of the presumable sidewall edge is at the minimum spacing greater than the vehicle width dimension W of the vehicle 100 from the sets G1 and G2 of the dots of the presumable sidewall edge. Accordingly, the set G3 of the dots of the presumable sidewall edge may be allowed to be the different group from the sets G1 and G2 of the dots of the presumable sidewall edge.

After the execution of the grouping process of the plurality of the sets of the dots of the presumable sidewall edge, the sidewall information calculator 1e may move on to step S220 in FIG. 3B. In step S220, the sidewall information calculator 1e may recognize an on-road object detected by the on-road object detector 1c, as a single sidewall, on the basis of a group of one or more sets of the dots of the presumable sidewall edge.

In other words, in this implementation, the sidewall information calculator 1e may recognize, as one continuous sidewall, the on-road object detected by the on-road object detector 1c at locations of the plurality of the sets of the dots of the presumable sidewall edge that bear relation of the minimum spacing of the first distance or closer.

As described, the image processing apparatus 1 according to this implementation includes the edge detector 1d and the sidewall information calculator 1e. The edge detector 1d detects the outlines extending from lower left toward upper right with respect to the objects located on the left side of the vehicle, and detects the outlines extending from lower right toward upper left with respect to the objects located on the right side of the vehicle, on the basis of the luminance value of the reference image. The reference image is any one of the pair of the images in the traveling direction of the vehicle captured by the stereo camera 2. The sidewall information calculator 1e recognizes, on the basis of the three-dimensional positional information of the objects having the outlines detected by the edge detector 1d, whichever of the objects having the outlines detected by the edge detector 1d is located at the predetermined height or greater from the road surface and has the predetermined length or greater in the front-rear direction of the vehicle, as the sidewall.

In the image processing apparatus 1 according to this implementation having the configuration as described above, the edge detector 1d may perform the edge detection process in the down direction and the lower-right direction, or the edge detection process in the up direction and the upper-left direction, or both, on the left half region of the reference image. The edge detector 1d may perform the edge detection process in the down direction and the lower-left direction, or the edge detection process in the up direction and the upper-right direction, or both, on the right half region of the reference image. In other words, the edge detector 1d in this implementation may perform the edge detection process in the two directions or in the four directions on each of the two regions of the reference image.

Hence, in the image processing apparatus 1 according to this implementation, it is possible to reduce a load of a sidewall recognition process, as compared to the pattern matching process with the use of the template image. It is, therefore, possible to provide the image processing apparatus 1 that makes it possible to execute, with the light load, the sidewall recognition based on the images captured in the traveling direction of the vehicle.

Moreover, in the image processing apparatus 1 according to this implementation, the sidewall information calculator 1e, upon recognizing the sidewall in the plurality, may recognize whichever of the sidewall in the plurality are at the spacing of the predetermined first distance or closer, as the identical sidewall.

For example, some sidewalls partially change in color or shape. In such a case, the set of the dots of the presumable sidewall edge to be detected by the edge detection process may have a break or breaks, and be unintentionally divided into two or more sets of the dots of the presumable sidewall edge. However, the sidewall information calculator 1e according to this implementation is able to recognize the unintentionally-divided sets of the dots of the presumable sidewall edge, as the identical sidewall.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

A part or all of the processes in the sidewall information calculation process as disclosed herein does not necessarily have to be processed on a time-series basis in the order described in the example flowchart. A part or all of the processes in the sidewall information calculation process may involve parallel processing or processing based on subroutine.

The three-dimensional positional information generation processor 1b, the on-road object detector 1c, the edge detector 1d, and the sidewall information calculator 1e illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the three-dimensional positional information generation processor 1b, the on-road object detector 1c, the edge detector 1d, and the sidewall information calculator 1e illustrated in FIG. 1. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the three-dimensional positional information generation processor 1b, the on-road object detector 1c, the edge detector 1d, and the sidewall information calculator 1e illustrated in FIG. 1.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An image processing apparatus, comprising:
an edge detector configured to detect outlines extending from lower left toward upper right with respect to objects located on left side of a vehicle, and detects outlines extending from lower right toward upper left with respect to objects located on right side of the vehicle, on a basis of a luminance value of an image out of a pair of images, the pair of images being images in a traveling direction of a vehicle captured by a stereo camera; and
a sidewall information calculator configured to recognize, on a basis of three-dimensional positional information of the objects having the outlines detected by the edge detector, whichever of the objects having the outlines detected by the edge detector is located at a predetermined height or greater from a road surface and has a predetermined length or greater in a front-rear direction of the vehicle, as a sidewall, wherein the pair of images include a reference image and a comparative image, wherein the edge detector detects the outlines extending from the lower left toward the upper right on a basis of an edge detection process based on a differential value of the luminance value along a horizontal line and a right-down line in a left half region of the reference image, the right-down line being a line that is (1) unparallel with the horizontal line and (2) inclined clockwise by an acute angle from the horizontal line, and wherein the edge detector detects the outlines extending from the lower right toward the upper left on a basis of an edge detection process based on the differential value of the luminance value along the horizontal line and a left-down line in a right half region of the reference image, the left-down line being a line that is (1) unparallel with the horizontal line and (2) inclined counter-clockwise by an acute angle from the horizontal line.

2. The image processing apparatus according to claim 1, wherein the sidewall information calculator, upon recognizing the sidewall in a plurality, recognizes whichever of the sidewall in the plurality are at a spacing of a predetermined distance or closer, as an identical sidewall.

3. The image processing apparatus according to claim 2, wherein the predetermined distance is a width of the vehicle.

4. The image processing apparatus according to claim 1, wherein the edge detector uses the reference image, as the image out of the pair of images.

5. The image processing apparatus according to claim 2, wherein the edge detector uses the reference image, as the image out of the pair of images.

6. The image processing apparatus according to claim 3, wherein the edge detector uses the reference image, as the image out of the pair of images.

7. The image processing apparatus according to claim 1, further comprising a three-dimensional positional information generation processor configured to calculate, on a basis of the pair of images, three-dimensional coordinate values of the objects with respect to the stereo camera, and outputs the three-dimensional coordinate values as the three-dimensional positional information.

8. The image processing apparatus according to claim 2, further comprising a three-dimensional positional information generation processor configured to calculate, on a basis of the pair of images, three-dimensional coordinate values of the objects with respect to the stereo camera, and outputs the three-dimensional coordinate values as the three-dimensional positional information.

9. The image processing apparatus according to claim 3, further comprising a three-dimensional positional information generation processor configured to calculate, on a basis of the pair of images, three-dimensional coordinate values of the objects with respect to the stereo camera, and outputs the three-dimensional coordinate values as the three-dimensional positional information.

10. The image processing apparatus according to claim 4, further comprising a three-dimensional positional information generation processor configured to calculate, on a basis of the pair of images, three-dimensional coordinate values of the objects with respect to the stereo camera, and outputs the three-dimensional coordinate values as the three-dimensional positional information.

11. The image processing apparatus according to claim 5, further comprising a three-dimensional positional information generation processor configured to calculate, on a basis of the pair of images, three-dimensional coordinate values of the objects with respect to the stereo camera, and outputs the three-dimensional coordinate values as the three-dimensional positional information.

12. The image processing apparatus according to claim 6, further comprising a three-dimensional positional information generation processor configured to calculate, on a basis of the pair of images, three-dimensional coordinate values of the objects with respect to the stereo camera, and outputs the three-dimensional coordinate values as the three-dimensional positional information.

13. The image processing apparatus according to claim 1, wherein the edge detector detects the outlines extending from the lower left toward the upper right on the basis of the edge detection process only along the horizontal line and the right-down line in the left half region of the reference image, and wherein the edge detector detects the outlines extending from the lower right toward the upper left on the basis of the edge detection process only along the horizontal line and the left- down line in the right half region of the reference image.

14. The image processing apparatus according to claim 1, wherein the predetermined height is 30 centimeters.

15. The image processing apparatus according to claim 1, wherein the predetermined length is 20 meters.

16. An image processing apparatus, comprising circuitry configured to detect outlines extending from lower left toward upper right with respect to objects located on left side of a vehicle, and detects outlines extending from lower right toward upper left with respect to objects located on right side of the vehicle, on a basis of a luminance value of an image out of a pair of images, the pair of images being images in a traveling direction of a vehicle captured by a stereo camera, and recognize, on a basis of three-dimensional positional information of the objects having the outlines detected, whichever of the objects having the outlines detected is located at a predetermined height or greater from a road surface and has a predetermined length or greater in a front-rear direction of the vehicle, as a sidewall, wherein the pair of images include a reference image and a comparative image, wherein the outlines extending from the lower left toward the upper left are detected on a basis of an edge detection process based on a differential value of the luminance value along a horizontal line and a right-down line in a left half region of the reference image, the right-down line being a line that is (1) unparallel with the horizontal line and (2) inclined clockwise by an acute angle from the horizontal line, and wherein the outlines extending from the lower right toward the upper left are detected on a basis of an edge detection process based on the differential value of the luminance value along the horizontal line and a left-down line in a right half region of the reference image, the left-down line being a line that is (1) unparallel with horizontal line and (2) inclined counter-clockwise by an acute angle from the horizontal line.

17. The image processing apparatus according to claim 16 wherein the outlines extending from the lower left toward the upper right are detected on the basis of the edge detection process only along the horizontal line and the right-down line in the left half region of the reference image, and wherein the outlines extending from the lower right toward the upper left are detected on the basis of the edge detection process only along the horizontal line and the right-down line in the left half region of the reference image, and wherein the outlines extending from the lower right toward the upper left are detected on the basis of the edge detection process only along the horizontal line and the left-down line in the right half region of the reference image.

18. The image processing apparatus according to claim 16, wherein the predetermined height is 30 centimeters.

19. The image processing apparatus according to claim 16, wherein the predetermined length is 20 meters.

\* \* \* \* \*